June 25, 1929.  J. H. SIEDENBURG  1,718,838
WINDOW
Filed Feb. 26, 1924   2 Sheets-Sheet 1
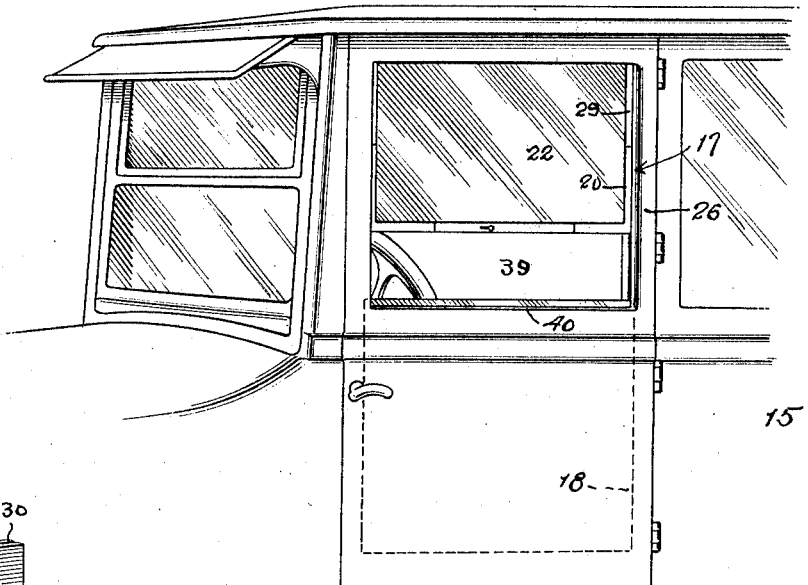
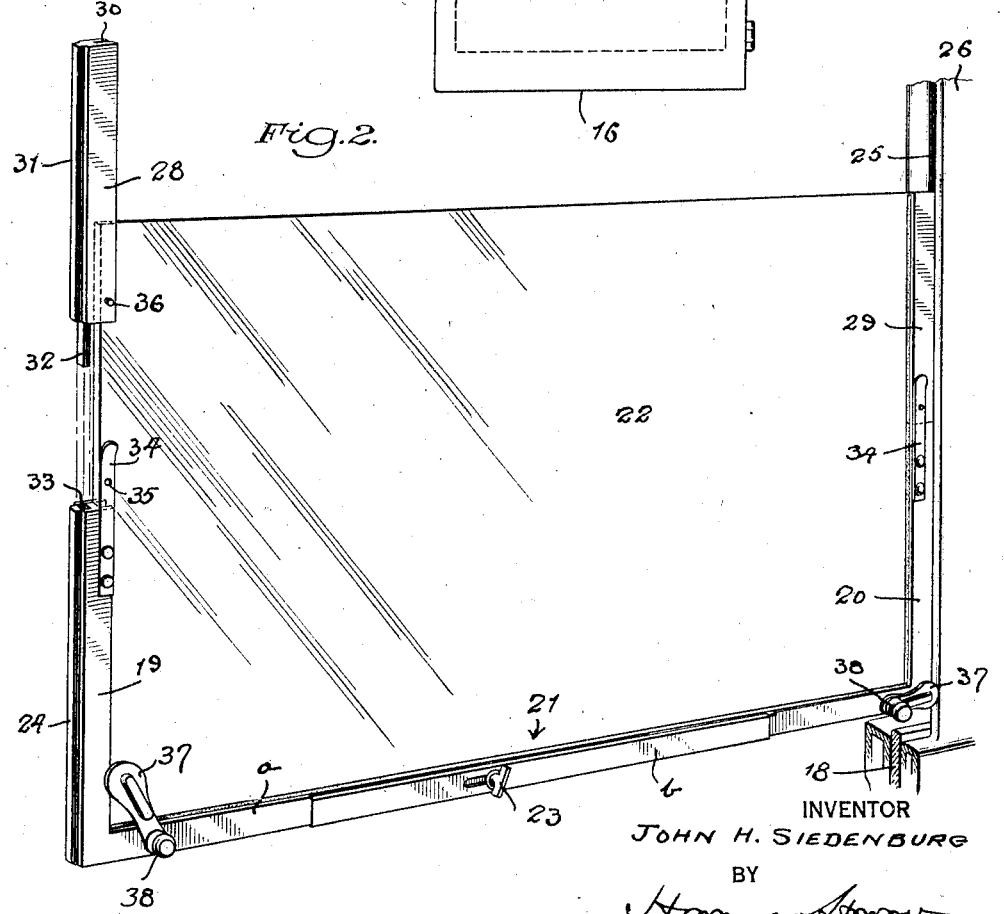
INVENTOR
JOHN H. SIEDENBURG
BY
ATTORNEYS

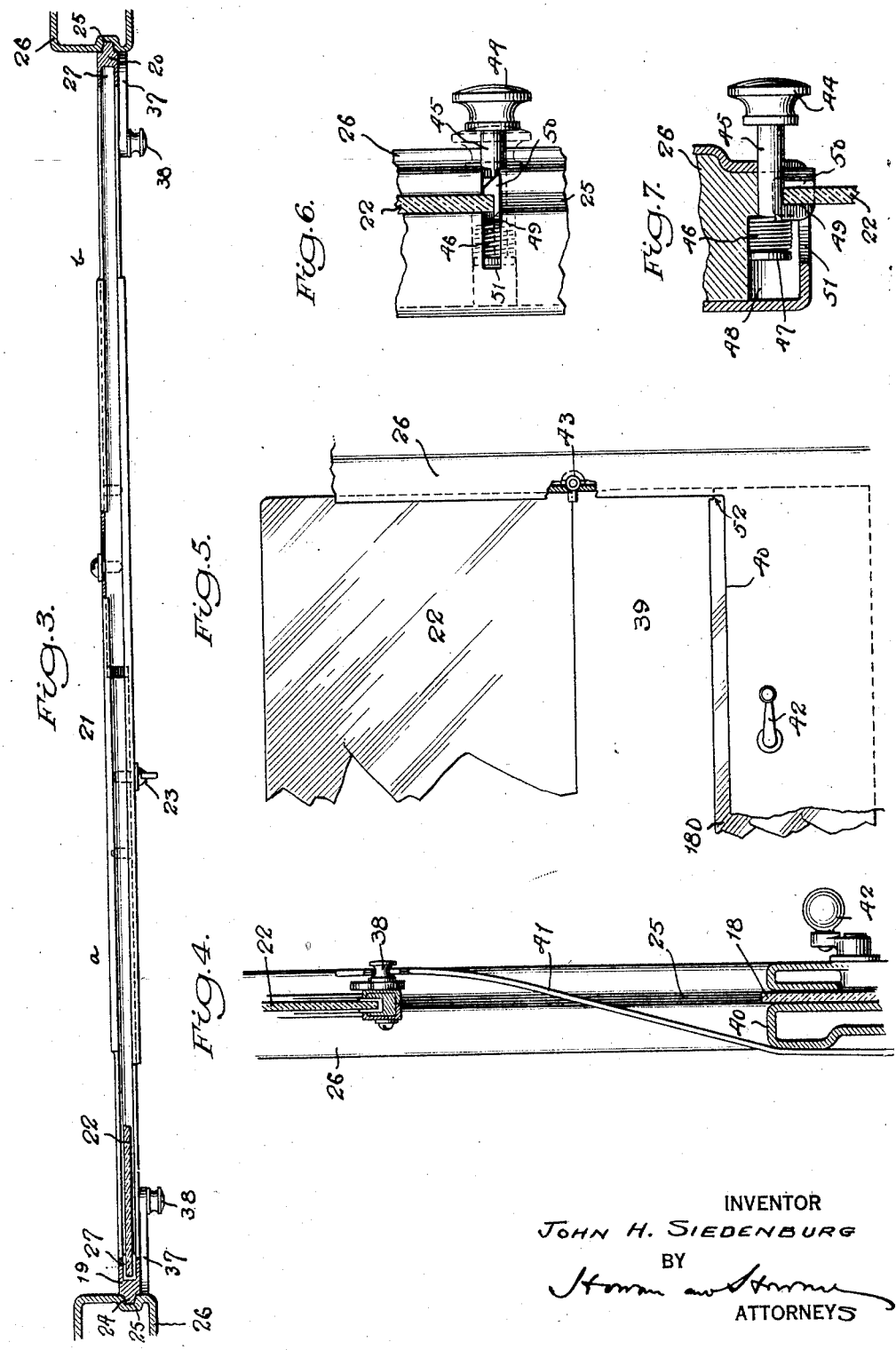

Patented June 25, 1929.

1,718,838

UNITED STATES PATENT OFFICE.

JOHN H. SIEDENBURG, OF BROOKLYN, NEW YORK.

WINDOW.

Application filed February 26, 1924. Serial No. 695,252.

My invention relates to windows, and particularly to a construction appropriate for the window adjacent the driver's seat of an automobile. The object of my invention is to provide a window construction such that it may be wholly closed, wholly open, or the upper portion of the window closed while a sufficient aperture in the lower portion of the window opening is afforded through which the driver may extend his arm or hand for signalling.

In the accompanying drawings—

Fig. 1 is a perspective of portion of a car body illustrating the door adjacent the driver's seat, and the application of my invention in one form to the door window;

Fig. 2 is a detached perspective of the auxiliary frame, portion of the permanent window frame being shown at the right side of the figure;

Fig. 3 is a horizontal section through the auxiliary frame;

Fig. 4 is a vertical section through the lower portion of the auxiliary frame showing the latter in installed position;

Fig. 5 is a broken side elevation of a modified arrangement for a built-in construction embodying my invention;

Fig. 6 is a vertical section through the window illustrating the catch mechanism, drawn to a large scale; and Fig. 7 is a horizontal section of the catch on the same scale as Fig. 6.

In the form shown in Figs. 1 to 4 inclusive, I have illustrated my invention in the form of an accessory applicable to closed cars of standard construction, or to winter bodies. The closed car body 15 illustrated is provided, adjacent the driver's seat, with a door 16 having a solid lower portion, and a window opening 17 in its upper portion. In standard closed car constructions, the window opening 17 is provided with a sheet of glass 18 of sufficient size to completely close the opening. Means are ordinarily provided for lowering the glass 18 either partially or wholly. When partly lowered substantial protection against the elements is still afforded, but the open space which is left between the upper edge of the glass and the top of the window frame is so far above the driver's seat that it is extremely awkward to pass the arm therethrough for signalling purposes. When the glass 18 is dropped to its full extent so that the entire window opening 17 is clear, the driver has ample room through which to thrust out the arm, but no protection against the elements is afforded. The present invention provides a window construction such that while the upper portion of the window opening is closed to protect the driver against the elements, a convenient space between the lower margin of the glass and the window frame is afforded for manual signalling.

In carrying out the invention in the form shown in Figs. 1 to 4, I provide an auxiliary frame comprising side uprights 19 and 20, and a horizontal bottom cross bar 21 for the support of a glass panel 22 of less vertical extent than the window opening. In order to adjust the auxiliary frame to window openings of different widths, the cross bar is preferably made in sections $a$ and $b$ which slidably interengage and are clamped together by means of a thumb screw 23. The uprights 19 and 20 are provided with ribs 24 adapted to enter the usual channels 25 in the side frame 26 of the door in which the glass 18 normally slides. The sides of the uprights which face the window opening are channelled at 27 for the reception of the glass panel 22. Cooperating with the uprights 19 and 20, which are solid with the cross bar 21, are extension sections 28 and 29 which, when associated with the main uprights 19 and 20, form side frame elements co-extensive with the vertical measure of the panel 22. These extensions are also channelled at 30 for the reception of the edge of the panel 22, and provided with ribs 31 which, in assembled position, register with the ribs 24 of the main uprights 19 and 20. An interlock between the side elements of the frame is provided by tongues 32 which project from the lower ends of the extensions 28 and 29 and enter corresponding holes 33 in the upper ends of the uprights 19 and 20. Spring tongues 34, apertured at 35, receive studs 36 at the lower end of each of the sections 28 and 29, thus locking the parts together.

Any suitable means may be provided for engaging the auxiliary frame in the upper portion of the window opening 17. For this purpose I have shown cam-like struts 37, pivoted on studs 38 projecting from the cross bar 21 of the frame and adapted to be swung out into engagement with the margin of the window frame 26.

To employ such an auxiliary frame and glass panel, the standard glass 18 is dropped into its pocket to leave the window opening 17 completely unobstructed. The portion of the auxiliary frame comprising the uprights 19 and 20, and the cross bar 21, is then adjusted in the window opening in such position that the ribs 24 of the uprights enter the channels 25 in the opposite side members of the fixed frame 26. The glass panel 22 is then inserted in the channels 27 of the uprights 19 and 20, while the auxiliary frame rests freely against the sill of the window opening 17. The side extensions 28 and 29 are then adjusted in position by sliding them down between the edges of the panel 22 and the fixed frame until they engage the uprights 19 and 20. With the parts thus assembled the auxiliary frame and its panel 22 are lifted until the upper margin of the panel 22 rests against the top cross bar of the fixed window frame. The locking cams 37 are then pressed outward into engagement with the side members 26 of the window frame, thus supporting the auxiliary frame and panel 22 in the upper portion of the window opening.

Protection against the elements is thus afforded by the panel 22, while ample arm room is afforded at 39 between cross bar 21 of the auxiliary frame and the window sill 40.

If desired a flexible apron 41 (Fig. 4) may be provided which is detachably engaged upon the studs 38 and is of sufficient extent to overlap the window sill 40 of the window. This flexible apron does not interfere with the outward thrust of the driver's arm through the opening 39.

In the remaining figures I have shown a simple arrangement by which the same thought may be embodied in a construction built into the door without material alteration of existing structural features. The glass for the window opening is divided into upper and lower panels 22 and 180. Their combined vertical extent is substantially that of the usual glass 18, but the lower panel 180 is of considerably less vertical extent than the upper panel. When the upper panel 22 is maintained in position, the opening 39, which results from the lowering of panel 180, affords sufficient arm room for the driver's convenience in signalling. Usual mechanism of any sort (not shown), such for instance as one operated by the hand crank 42, may be used for raising and lowering the panels in unison. If, however, it is desired to maintain the upper panel 22 in position while the lower panel 180 is dropped, this may be readily accomplished by means of a catch 43. In the form shown this catch 43 comprises a thumb piece 44, the shank 45 of which passes through the side frame 26 of the window. It is normally drawn inward against the frame by a spring 46 interposed between a washer 47 at the inner end of the stem 45 and a wall of the recess 48 formed in the side frame for the reception of this catch. Laterally projecting from the stem 45 is a supporting flange 49 with beveled nose 50, these parts projecting through a slot 51 which opens to the vertical channel 25 in the side frame 26. When the thumb piece 44 is drawn outward against the effort of the spring 46 the beveled nose 50 of the catch passes beneath the lower margin of the panel 22 and affords a shoulder which, while the glass rests upon the flange 49, bears against the face of the panel under the stress of the spring 46, thus not only holding the catch in position, but also tending to prevent vibration of the panel 22 supported thereon.

In order to release the panel 22 to permit it to rest as usual upon the section 180, so that it may be raised or lowered with the latter, it is only necessary to slightly lift the panel 22 to free the nose 50 of the catch, whereupon the latter will spring into non-obstructing position, indicated in dotted lines in Fig. 6. A clearance through which the catch may be drawn out, is afforded by a notch 52 in the upper edge of the lower panel 180 (Fig. 5).

Various other constructions for accomplishing like results in either type of construction will readily occur to those dealing with the problem. My object is to provide what is in effect a storm protection for the upper portion of the window opening, while leaving the lower portion exposed or protected only by a flexible apron, so that the driver of the car may have a convenient opening through which to extend his arm for signalling. With the understanding that this underlying inventive thought may be variously embodied, I claim—

1. The combination with an automobile body shaped to afford a window opening and a subjacent pocket, of glass for the window comprising a panel adapted to close only the upper portion of the opening, a detachable frame for holding said panel in position in the window opening, means for holding said frame in position, together with a second panel adapted to enter said pocket and means to raise and lower said second panel to complete the closure of the lower portion of said opening or to leave said portion open.

2. The combination with an automobile body having a swinging door shaped to afford a window opening and a subjacent pocket, of glass for the window opening comprising a panel adapted to close only the upper portion of the opening, means for holding said panel fixedly in closed position, together with a second panel adapted to enter said pocket, and means arranged on the inner side of said door and below the window opening to raise and lower said second panel independently of the first panel.

3. A window construction comprising a structure affording a window opening and a subjacent pocket, in combination with glass for said window comprising vertically superposed independent panels adapted to close the window opening, unitary means for raising and lowering said panels in unison, and means for detaining the upper panel in raised position while the lower panel is lowered into the pocket to afford a hand opening below the upper panel.

4. The combination with a body having a window opening provided with vertical ways, one on each side and a pocket to receive a vertically slidable window for opening at the top, of a window comprising a pane divided horizontally into a plurality of panels independently slidable in said ways and restrained against lateral movement, and means to maintain at will an upper panel stationary independent of the lower panel.

5. The combination with a body having a window opening provided with vertical ways, one on each side and a pocket to receive a vertically slidable window for opening at the top, of a window comprising a pane divided horizontally into two panels independently slidable in said ways and restrained against lateral movement, and a catch for maintaining at will the upper panel in closed position independent of the lower panel.

6. A window or the like comprising two panes, mechanism for raising and lowering the panes as a unit, means for locking the upper pane, said upper and lower panes being adapted to be raised and lowered by the same mechanism.

7. A window or the like, comprising a frame, two panes both slidably mounted in said frame, said frame having a recess in its lower part, said panes being raised to their upper positions to close the window and lowered into said recess to open the window, and said panes always occupying a position whether open or closed in which the upper window is above the lower, and means for raising and lowering said panes, said window having between the lower edge of the upper pane and the upper edge of the lower pane a protecting member to prevent direct contact of the panes.

In testimony whereof I have signed my name to this specification.

JOHN H. SIEDENBURG.